United States Patent [19]

Calais

[11] Patent Number: 4,982,559
[45] Date of Patent: Jan. 8, 1991

[54] NUT HARVESTER

[76] Inventor: Anthony J. Calais, 107 Denier, Lafayette, La. 70508

[21] Appl. No.: 411,912

[22] Filed: Sep. 22, 1989

[51] Int. Cl.⁵ .............................................. A01D 51/00
[52] U.S. Cl. ..................................... 56/328.1; 56/14.9
[58] Field of Search ...................... 56/328.1, 329, 126, 56/207, 220, 221, 364; 15/79 R; 209/288, 390

[56] References Cited

U.S. PATENT DOCUMENTS

| | | | |
|---|---|---|---|
| 3,475,889 | 11/1969 | Overstreet et al. | 56/328.1 |
| 3,530,655 | 9/1970 | Whitney et al. | 56/328.1 |
| 3,591,948 | 7/1971 | Brumbaugh et al. | 56/328.1 |
| 3,872,657 | 3/1975 | Ramacher et al. | 56/328.1 |

Primary Examiner—Stephen J. Novosad
Attorney, Agent, or Firm—Berman, Aisenberg & Platt

[57] ABSTRACT

A power driven nut harvester of the invention is a self-propelled device for sweeping nuts from the ground into a housing by means of a power driven rotary drum equipped with flexible tines or with flexible rubber strip material. The power unit also propels the harvester at a substantially constant speed. The nuts are separated from debris by passing them at high velocity through a stiff bristle brush which repels the debris and directs the nuts for collection into a receiving bin. A spring loaded deflector plate adjacent the sweeper drum is kept in proper alignment by a fifth wheel maintained in constant contact with the ground.

20 Claims, 2 Drawing Sheets

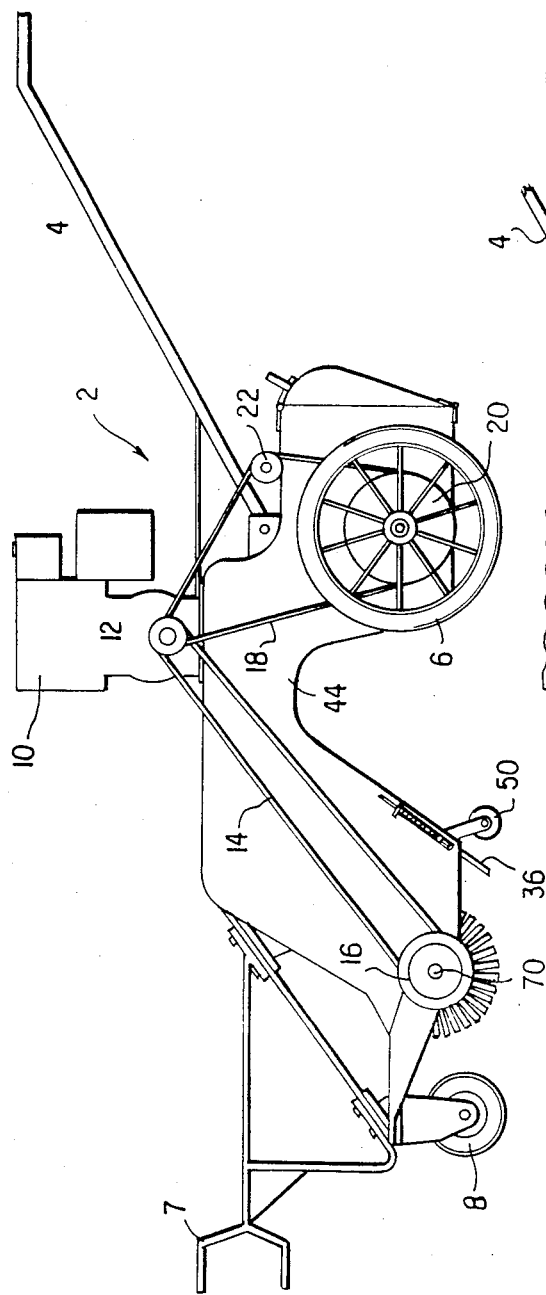
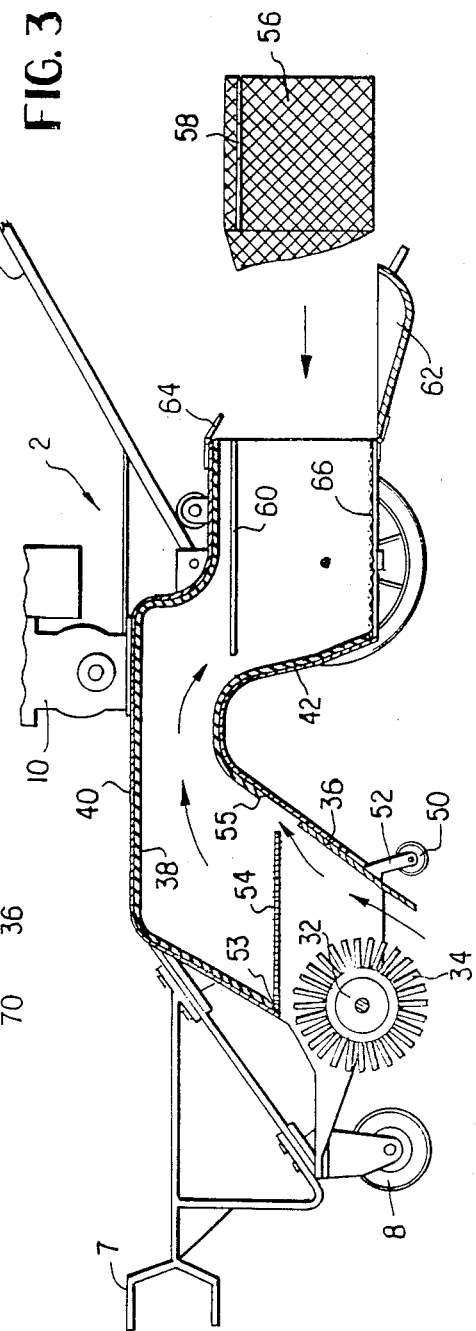

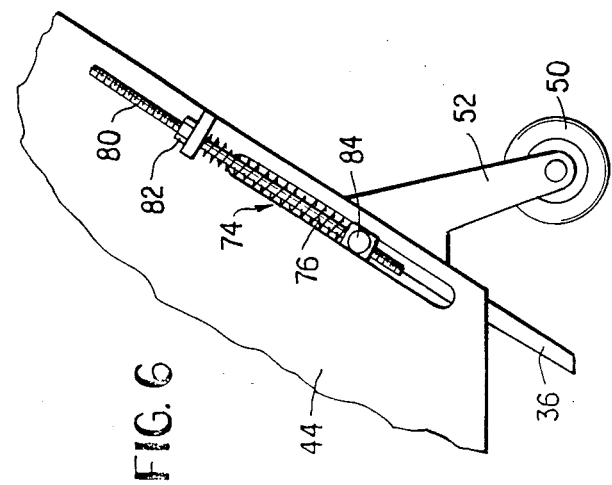
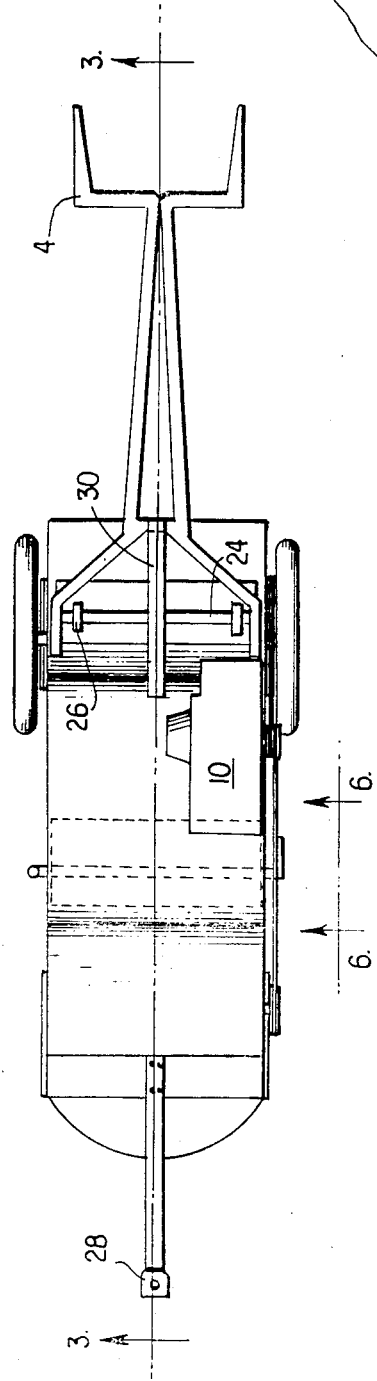
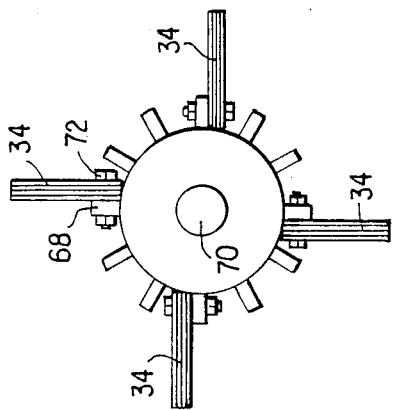
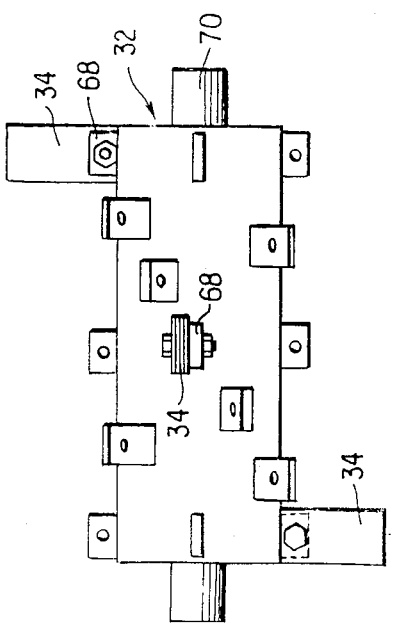

NUT HARVESTER

FIELD OF THE INVENTION

The invention relates to apparatus for gathering nuts from the ground.

BACKGROUND OF THE INVENTION

Known gathering machines do not succeed in picking up nuts, such as pecans, successfully. Wilson, U.S. Pat. No. 3,789,590, describes a self propelled power rake for removing weeds, leaves, lawn cuttings and debris from the ground. U. S. Pat. No. 3,518,819, to Schneider, describes a wheel mounted brush pickup for vegetation on a field surface, which uses bristled rollers for picking up the vegetation.

SUMMARY OF THE INVENTION

A power driven nut harvester of the invention is a self-propelled device for sweeping nuts from the ground into a housing by means of a power driven rotary drum equipped with flexible tines. The power unit also propels the harvester. The nuts are separated from debris by passing them at high velocity through a stiff bristle brush which repels the debris and directs the nuts for collection in a receiving bin. A spring loaded deflector plate adjacent to the sweeper drum is kept in alignment by a fifth wheel which maintains constant contact with the ground.

It is an object of the invention to provide a power driven nut harvester.

It is an another object of the invention to provide a power driven nut harvester which does not use blowers or conveyors.

It is a further object of the invention to provide a nut harvester having an accessible nut receiving bin and operated by a person walking with the harvester.

It is yet another object of the invention to provide a nut harvester which may be towed behind a tractor or mower.

BRIEF DESCRIPTION OF THE DRAWINGS

FIG. 1 is a side elevational view of a nut harvester of the invention.

FIG. 2 is a top plan view of a nut harvester of FIG. 1.

FIG. 3 is a side view, partly in cross-section, taken on line 3—3 of FIG. 2.

FIG. 4 is a front elevational view of a first embodiment of the sweeper drum assembly, showing mounting of rubber finger strip sweeping material.

FIG. 5 is a cross sectional view of a second embodiment of the sweeper drum assembly, showing the mounting of rubber belting sweeping material.

FIG. 6 is an enlarged detail of the deflector plate adjustment assembly taken on line 6—6 of FIG. 2.

DETAILED DESCRIPTION OF THE INVENTION

A nut harvester of the invention is a self-propelled sweeping device which gathers nuts without using conveyors or blowers, and which is guided by a person walking with the device. Alternatively, the device may be towed by a tractor or mower. The harvester is suitable for use by a person having only a few nut trees, or it can be used over larger areas, as necessary. The harvester is useful for gathering most types of nut.

Nuts are swept from the ground into the harvester housing by means of a power driven rotary drum equipped with a plurality of flexible tines which sweep the ground. The power unit also propels the harvester at a constant speed. The nuts are separated from debris by passing them at high velocity through a stiff bristle brush which repels the debris and directs the nuts along a path which reduces the nut velocity by deflecting them off padded interior walls of the harvester housing for collection in a self-contained receiving bin. The bin includes a wire mesh bottom panel through which any remaining debris falls, due to the vibrations of the harvester. The receiving bin includes a door for facilitating removal of the nuts when the bin is full and may also include a removable bag.

A spring loaded plate adjacent the sweeper drum, for deflecting nuts and debris, is kept in proper alignment by a fifth wheel which is constantly in contact with the ground, regardless of any unevenness in the ground contour.

With reference to the Figures, in which like numerals represent like parts, FIG. 1 illustrates nut harvester 2 which is guided by a person holding handle 4 while walking with the harvester. Handle 4 is used for pushing or maneuvering the harvester about the axis of wheels 6. Alternatively, harvester 2 may be towed by a tractor secured to the harvester by means of attachment bracket 7. Caster wheel 8 swivels when harvester 2 is turned to change direction.

Engine 10 drives the nut sweeping mechanism and also propels the harvester. Engine drive pulley 12 is connected by belt 14 to sweeper drum pulley 16, and by belt 18 to wheel pulley 20, via jack shaft pulley 22.

FIG. 2 shows a preferred location for engine 10, on top of the harvester. Jack shaft 24 includes mounting bearings 26 and jack shaft pulley 22 (shown in FIG. 1). Handle 4 may, if preferred, be a single bar handle. Tow bracket 28 is used for towing harvester 2 behind a tractor. Handle 4 may be supported by truss 30.

Operation of harvester 2 is shown in FIG. 3. Sweeper drum 3 has finger pads 34 which contact the ground and sweep nuts from the grass and debris. The nuts are lifted by finger pads 34 and propelled through the body of harvester 2 along the path indicated by the arrows. Some of the nuts (or debris) may be thrown against deflector plate 36 or deflected by rubber padding 38 which lines upper plate 40 and lower plate 42. Upper plate 40 and lower plate 42 are spaced apart by side panels 44, thus forming a path for the nuts to travel through the harvester. Deflector plate 36 is spring biased, as shown in detail in FIG. 6, to maintain a fixed clearance between deflector plate 36 and the ground, governed by wheel 50 (supported by strut 52).

Nuts are picked up from the ground by finger pads 34 of sweeper drum 32 and propelled at high velocity through fixed brush barrier 54 into the body of the harvester. Debris is repelled by brush barrier 54, and falls to the ground. The nuts may rebound off rubber padding 38 and are deposited in a removable container, such as receiving bag or basket 56, which is supported by flange 58 which is engaged on channel 60 when basket 56 is in position for collecting nuts. Access to the basket retaining structure is gained through door 62 which is latched in closed position by clip 64. Sifter screen 66 in lower plate 42 allows fine debris to escape.

Brush barrier 54 is, in a preferred embodiment, a brush of stiff bristles attached to front wall 53 of the body of harvester 2, reaching substantially horizontally across the entry passage to close to wall 53 of the body of harvester 2. Nuts and debris, such as grass clippings and twigs lying beneath the nut trees, are swept by finger pads 34 of sweeper drum 32 against deflector plate 36 and against brush barrier 54. The nuts deflect the flexible bristles and pass through brush barrier 54 into the body of the harvester along the path shown by the arrow in FIG. 3. The grass and twigs are deflected by the bristles and fall to the ground. Brush barrier 54 may be made of stiff but flexible natural or synthetic bristles, metal, plastic, rubber or other material which functions to allow nuts to pass and debris to be barred. The material must be sufficiently flexible to allow the nuts to pass through, but sufficiently stiff to repel debris such as grass and twigs, which are unable to flex the bristles adequately for entry into the body of the harvester. Other materials and placement of the brush barrier for selectively allowing the nuts to enter the harvester, without using a blower or conveyor, will be apparent to one skilled in the art.

FIGS. 4 to 6 show details of the apparatus. FIG. 4 shows a first embodiment of sweeper drum 32 which includes carrier lugs 68 secured to the perimeter of the drum face. Rubber strip finger pads 34 are fastened to appropriate carrier lugs 68. The flexible strip finger pads lift nuts into the body of the harvester as the sweeper drum is rotated. Shaft 70 supports sweeper drum 32. An appropriate number and staggered arrangement of finger pads will be apparent to one skilled in the art.

A cross-sectional view of a second embodiment of the sweeper drum is shown in FIG. 5 which illustrates rubber belting strips 35 attached to carrier lugs 68 by fasteners 72. Rubber belting 35 may be flexible strip material, such as two-ply 0.375 inch thick rubber belting, which extends substantially across the width of the sweeper drum and enables nuts to be gathered into the body of the harvester as the drum is rotated. A suitable number of rubber strips are used, generally three or four strips, as will be apparent to one skilled in the art.

Details of the spring assembly 74 are shown in FIG. 6. Spring assembly 74 moves up and down in slot 76 and is associated with deflector plate 36 which extends outwardly through side panels 44 and 46. Threaded retainer rod 80 passes through nut 82 and spring assembly 74 is retained and adjusted by nut 84 at its other end.

While the invention has been described above with respect to certain embodiments thereof, it will be appreciated that variations and modifications may be made without departing from the spirit and scope of the invention.

What is claimed is:

1. A nut harvester comprising:
wheeled body means for guiding in a path;
sweeper means attached to the body means for collecting nuts;
flexible elongated means on the sweeper means for picking up nuts;
passage means in the body means for allowing nuts to pass through into said body means;
barrier means attached to said body means extending substantially across said passage means for substantially barring passage of debris; and
means extending from the body means adjacent the sweeper means for deflecting nuts toward said passage means; and
means for receiving nuts attached to said body means.

2. A nut harvester according to claim 1 further comprising power means for rotating the sweeper drum.

3. A nut harvester according to claim 1 further comprising power means for driving the harvester.

4. A nut harvester according to claim 2 further comprising power means for driving the harvester.

5. A nut harvester according to claim 4 wherein the passage means further comprises barrier means for allowing passage of nuts and barring passage of debris.

6. A nut harvester according to claim 5 wherein the barrier means extends substantially across the passage means.

7. A nut harvester according to claim 6 wherein the barrier means is attached to a front wall of the body means.

8. A nut harvester comprising:
power means for driving the harvester;
wheeled body means for guiding in a path;
sweeper means attached to the body means for collecting nuts;
power means for rotating said sweeper means;
flexible elongated means on the sweeper means for picking up nuts;
passage means in the body means for allowing nuts to pass through into said body means;
barrier means comprising bristles for substantially barring passage of debris;
means extending from the body means adjacent the sweeper means for deflecting nuts toward said passage means; and
means for receiving nuts attached to said body means.

9. A nut harvester according to claim 8 wherein the bristles comprise natural or synthetic bristles.

10. A nut harvester according to claim 8 wherein the bristles comprise flexible metal.

11. A nut harvester according to claim 8 wherein the bristles comprise flexible rubber or plastic.

12. A nut harvester according to claim 1 wherein the sweeper means comprises a rotating drum.

13. A nut harvester according to claim 12 wherein the flexible elongated means comprises elongated rubber pads.

14. A nut harvester according to claim 1 wherein the deflecting means is spring biased.

15. A nut harvester according to claim 1 further comprising padding means for deflecting nuts secured to an inside surface of the body means.

16. A nut harvester according to claim 1 further comprising removable container means for receiving harvested nuts.

17. A nut harvester comprising:
wheeled body means for guiding in a path;
rotating sweeper means attached to the body means for collecting nuts;
power means for driving said wheeled body means and for rotating said sweeper means.
flexible, elongated means on the sweeper means extending substantially across the width of the sweeper means for collecting nuts;
resilient brush means attached to a front wall of the body means for passing nuts into the body means and for substantially barring passage of debris;
biased means extending from the body means adjacent the sweeper means for deflecting nuts toward said brush means; and
means for receiving nuts attached to said body means.

18. A nut harvester according to claim 17 wherein the bristles comprise natural or synthetic bristles.

19. A nut harvester according to claim 17 wherein the bristles comprise flexible rubber or plastic.

20. A nut harvester according to claim 17 wherein the bristles comprise flexible metal.

* * * * *